United States Patent [19]

Kobori et al.

[11] 4,204,756
[45] May 27, 1980

[54] CAMERA EXPOSURE FACTOR INDICATING DEVICE

[75] Inventors: Toshio Kobori, Sakai; Masayoshi Sahara, Sennan; Mitsuru Saito, Sakai, all of Japan

[73] Assignee: Minolta Camera Kabushiki Kaisha, Osaka, Japan

[21] Appl. No.: 862,776

[22] Filed: Dec. 21, 1977

Related U.S. Application Data

[63] Continuation of Ser. No. 706,215, Jul. 19, 1976, abandoned.

[30] Foreign Application Priority Data

Jul. 25, 1975 [JP] Japan .................................. 50-91349

[51] Int. Cl.² ............................................. G03B 17/20
[52] U.S. Cl. .................. 354/53; 354/23 D; 354/60 L
[58] Field of Search ................... 354/23 D, 53, 54, 55, 354/56, 60 R, 60 L, 289; 356/226, 224, 228, 218

[56] References Cited

U.S. PATENT DOCUMENTS

| | | | |
|---|---|---|---|
| 3,818,495 | 6/1974 | Sagara et al. | 354/53 |
| 3,895,875 | 7/1975 | Kitaura et al. | 354/53 |
| 3,956,758 | 5/1976 | Numata et al. | 354/53 |
| 3,967,288 | 6/1976 | Yamamoto | 354/53 |
| 3,988,069 | 10/1976 | Kitaura | 356/218 |
| 3,990,799 | 11/1976 | Nanba et al. | 354/23 D |

FOREIGN PATENT DOCUMENTS

2439181 2/1976 Fed. Rep. of Germany ............. 354/53
50-50346 5/1975 Japan .

*Primary Examiner*—Russell E. Adams
*Attorney, Agent, or Firm*—Watson, Cole, Grindle & Watson

[57] ABSTRACT

A plate member bearing thereon a pair of first symbols respectively representative of the highest shutter speed and the lowest shutter speed, a pair of second symbols respectively representative of middle shutter speeds, and three letters or zone marks are arranged between the first and the second symbols and also between the second symbols. The plate member is disposed between a focussing plate and a pentagonal prism, which form a viewfinder of a single lens reflex camera. The first and second symbols are illuminated by light from outside of the camera, which light has passed through the focussing plate after being reflected by a movable mirror. For the illumination of the letters or the zone marks, three light emitting diodes are provided in corresponding relation to the letters or zone marks, and an electric circuit responsive to a light measuring circuit selectively continuously lights one of the three light emitting diodes when the brightness of an object to be photographed is at an appropriate level and selectively intermittently lights one of the two light emitting diodes corresponding to the letters or zone marks adjacent to the first symbols when the brightness of the object is at a level over or under the appropriate level. Also, three light guides are provided respectively in corresponding relation to the light emitting diodes and the letters or the zone marks for transmitting the light emitted from the corresponding light emitting diode to the corresponding letter or zone mark.

12 Claims, 14 Drawing Figures

Fig.6
| Range | Lower Outside | Blurring | Middle Speed | High Speed | Higher Outside |
|---|---|---|---|---|---|
| Out 1 | H | L | L | L | L |
| Out 2 | H | H | L | L | L |
| Out 3 | H | H | H | L | L |
| Out 4 | H | H | H | H | L |
| 5a | Flickering | Lighting | | | |
| 5b | | | Lighting | | |
| 5c | | | | Lighting | Flickering |
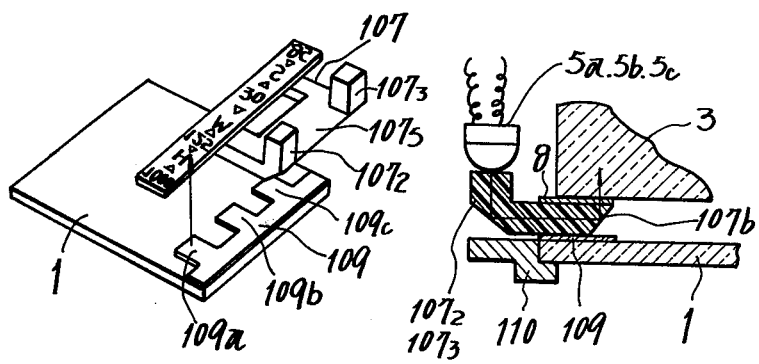
Fig.7
Fig.8
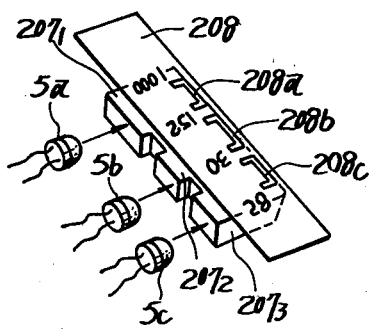
Fig.9
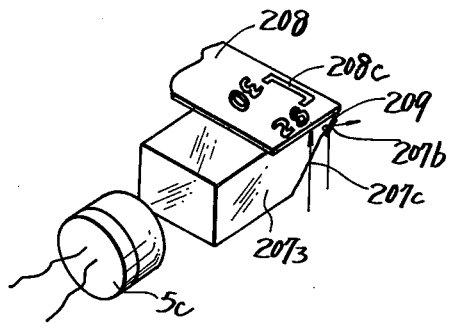
Fig.10

CAMERA EXPOSURE FACTOR INDICATING DEVICE

This is a continuation, of application Ser. No. 706,215 filed July 19, 1976, now abandoned.

BACKGROUND OF THE INVENTION

This invention relates to devices for indicating photographic information, such as the shutter speed and the aperture value within a viewfinder, by using luminous bodies, in an electric exposure camera. A variety of such type indicating devices have been proposed. For example, a shutter-speed indicating device may be arranged such that the reciprocals of the shutter speed numbers are positioned for every exposure value, such as 1000, 500, . . . 1, on an indicating plate disposed within a viewfinder, with luminous elements disposed adjacent the respective numerals. At least one of the luminous bodies is illuminated in response to signals commensurate with, for example, the shutter speed, which are obtained from a light measuring circuit, so as to indicate the selected shutter speed.

In the case of an electric exposure camera, in which the exposure is automatically controlled, it is not always necessary to indicate the shutter speed or the aperture value for every value thereof, but it is sufficient to indicate at least three numerical values corresponding to the highest and lowest brightness limit and the blur limit of the exposure. In view of the above, the indicating devices of the prior art provide superfluous indications, with an accompanying increased number of luminous elements, resulting in an increase in the manufacturing cost.

SUMMARY OF THE INVENTION

It is, therefore, an object of the present invention to provide an exposure factor indicating device which is particularly useful for an automatically controlled exposure camera.

Another object of the present invention is to provide an exposure factor indicating device of the type described herein in which the necessary and satisfactory indication of an exposure factor is made with less a number of optical indicating elements than in conventional devices.

Still another object of the present invention is to provide an exposure factor indicating device of the type described above which can be manufactured with lower cost than conventional devices because of a smaller number of optical indicating elements.

To accomplish these objects in accordance with the present invention, no more than three first symbols, two of which are respectively representative of values of an exposure factor representative of high and low brightness, respectively, are disposed in a viewfinder of an automatically controlled exposure camera in respective order of the exposure factor values. Means for introducing light from the outside of the camera to the first symbols is provided for illumination thereof. Further, a plurality of second symbols are respectively disposed between the first symbols, and the same number of optical indicating elements are respectively disposed in corresponding relation to the second symbols. A light measuring circuit for generating an electric signal commensurate with the brightness of an object to be photographed and means for selectively actuating one of the optical indicating elements in accordance with the electric signal output of the light measuring circuit are also provided. According to the exposure factor indicating device of the above described combination, one of the second symbols is indicted by means of the corresponding optical indicating elements in accordance with the brightness of the object, with the first symbols being illuminated by external light. In other words, a range of values of the exposure factor can be read by means of the indicated second symbol and the first symbols adjacent thereto. Such indication of values of the exposure factor is necessary and satisfactory in automatically controlled exposure cameras as described above. Moreover, the number of optical indicating elements, the cost of which is significant, are reduced since the number thereof may be less than the number of the first symbols. This results in lowering the manufacturing cost of the device.

In an alternative embodiment according to the present invention, the exposure factor indicating device has even less number of optical indicating elements than in the above described combination. More particularly, one of the optical indicating elements which corresponds to the second symbol adjacent to the first symbol for the high brightness is deleted, and the light introducing means is modified to introduce the light from the outside to the second symbol adjacent to the first symbol to indicate high brightness and also to introduce light as well to the first symbols.

In a preferred embodiment of the present invention, the optical indicating elements are light emitting elements such as light emitting diodes (LED), and the actuating means includes an electric circuit which selectively lights one of the light emitting elements when the electric signal from the light measuring circuit is at a level corresponding to values of the exposure factor between the critical values for high and low brightness. One of the light emitting elements corresponding to the second symbols adjacent to the first symbols is caused to flicker when the electric signal is at a level corresponding to values of the exposure factor beyond the critical values. The flickering of the light emitting elements implies that the brightness of the object is so high or low that an exposure cannot be controlled even with the exposure factors at the critical values, and thus expands the indication ability of the exposure factor indicating device. Also, in the preferred embodiment, the first and second symbols are carried on a plate member disposed between the pentagonal prism and the focussing plate, which form a viewfinder of a single lens reflex camera. However, as the space between the pentagonal prism and the focussing plate is too narrow to dispose the light emitting elements, such elements are disposed beside the focussing plate, and thus a plurality of light guides are provided which are respectively disposed in corresponding relation to one of the light emitting elements and the second symbols on the plate member and which respectively have a surface facing the corresponding light emitting element and a surface facing the corresponding second symbol. Further, the light introducing means includes the focussing plate and the mirror, movable between a viewing position and a picture taking position, and introduces external light, i.e., the light from the object to the plate member. To prevent the second symbols on the plate member from being illuminated by the light from the outside, a light shielding member having light shielding portions disposed under the second symbols is provided between the plate member and the focussing plate.

BRIEF DESCRIPTION OF THE DRAWINGS

The above and other objects and features of the present invention will become apparent from a reading of the following description of the preferred embodiments taken in connection with the accompanying drawings, in which:

FIG. 6 is a table showing the relation between the range of shutter speeds and the outputs of comparing circuits and the state of the light emitting diodes;

FIG. 7 is a perspective view of a shutter speed indicating device according to a second embodiment of the present invention;

FIG. 8 is a cross-sectional view of the device shown in FIG. 7;

FIG. 9 is a perspective view of an essential part of a shutter speed indicating device according to a third embodiment of the present invention;

FIG. 10 is an enlarged perspective view of the part shown in FIG. 9;

DETAILED DESCRIPTION OF THE PREFERRED EMBODIMENTS

Referring to FIGS. 1 to 5, focussing plate 1, movable reflecting mirror 2, pentagonal prism 3, and condenser lens 4, all constitute the viewfinder optical system of a single-lens-reflex camera together with an unshown conventional taking lens and an eye-piece, for example, as shown in U.S. Pat. No. 3,777,637.

Figure 1:
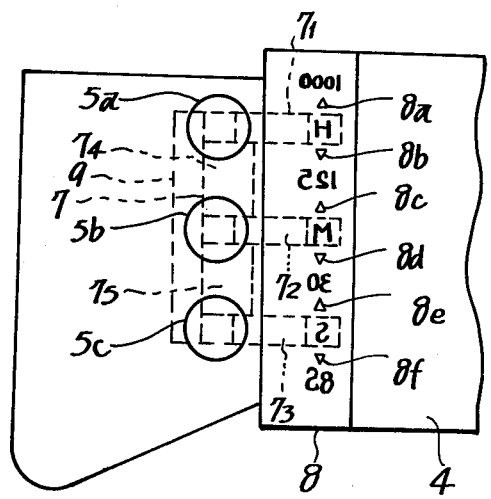
FIG. 1 is a plan view of an essential part of a shutter speed indicating device according to a first embodiment of the present invention.
Figure 2:
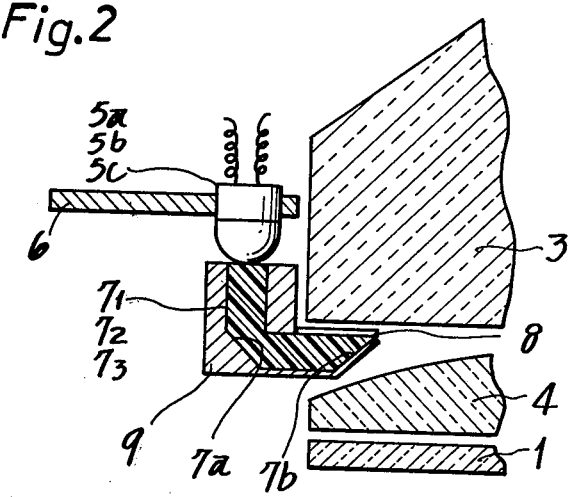
FIG. 2 is a cross sectional view of the component shown in FIG. 1.
Figure 3:
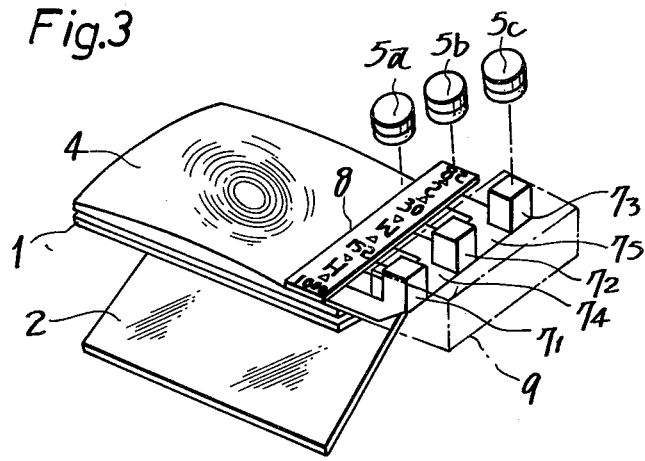
FIG. 3 is a perspective view of the device according to the first embodiment.
Figure 4:
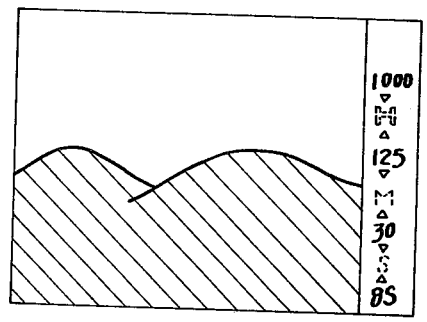
FIG. 4 shows the field of view of a viewfinder of the device according to the first embodiment, in which the letter H is illuminated by the light from a light emitting diode.

Light emitting diodes (hereinafter referred to as LED; 5a, 5b, and 5c are fixed to a camera body (not shown) by way of LED holders 6 which are integral with the camera body. LEDs 5a, 5b and 5c emit light selectively in accordance with shutter speed signals from a light measuring circuit which is described below. Light guide 7 for guiding the light from LEDs 5a, 5b, 5c to indicating plate 8, has three rectangularly bent guide portions $7_1$, $7_2$, and $7_3$ corresponding to each LED and connecting portions $7_4$ and $7_5$ as shown in the Figures, and is formed by means of, for example, molding. Light guide 7 is mounted by light guide holder 9 which also serves to prevent outer light which has not passed beside focussing plate 1 from entering indicating plate 8 in such a manner that the incident surfaces of guide portions $7_1$, $7_2$ and $7_3$ come in contact with LEDs 5a, 5b, and 5c. Thus, light from each LED is reflected at reflecting surfaces 7a and 7b of each guide portion and falls on indicating plate 8. Indicating plate 8, which is made of transparent material, is fixed to the upper surface of the bent portion of light guide 7 between pentagonal prism 3 and condenser lens 4, and has letters 1000, H, 125, M, 30, S, 8S and triangle signs 8a, 8c, 8d, 8e, 8f between the letters on it as best shown in FIG. 3. The portions marked with the letters H, M, and S, are located over the reflecting surface 7b of guide portions $7_1$, $7_2$, and $7_3$ respectively, and they are illuminated by the light from each LED reflected at reflecting surface 7b. Indicating plate 8 is positioned on focussing plate 1, so that it is seen outside the frame of the viewfinder, and the letters 1000, 125, 30, 8S and the triangle signs are illuminated by the outer light which has been reflected at reflecting mirror 2, after passing through the taking lens and diffused by focussing plate 1 and has passed condenser lens 4. Part of this outer light is transmitted to reflecting surface 7b of each guide portion, but in the present embodiment the light transmitted to reflecting surface 7b does not fall into light guide 7 because part of light guide holder 9 covers reflecting surface 7b as shown in FIG. 2. Thus the letters H, M, and S, on indicating plate 8 are completely hidden from the outer light.

Numeral 1000 indicates 1/1000 second, i.e. the highest limit of the shutter speed, 8S indicates the lowest limit 8 seconds, 30 indicates 1/30 second as the critical speed for a hand-held camera, and 125 indicates 1/125 second, which is an intermediate speed.

Figure 5:
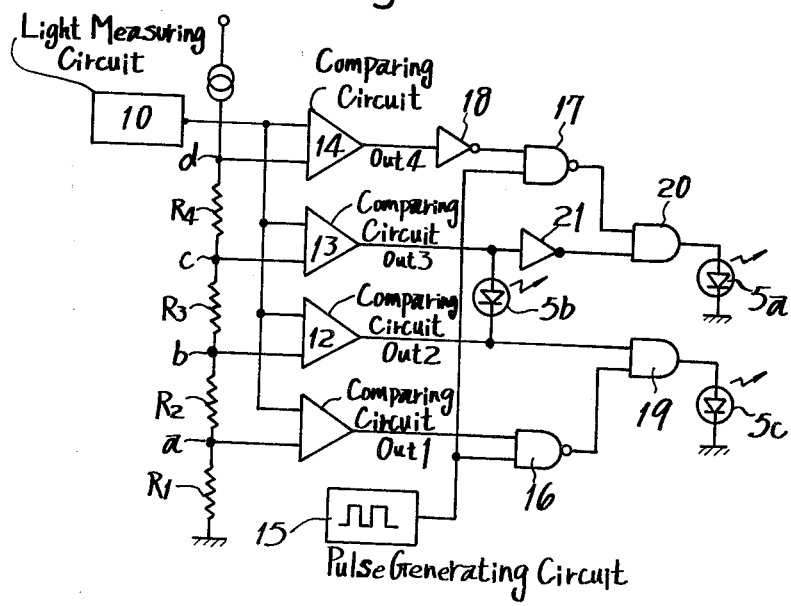
FIG. 5 is a block diagram of an electric circuit for the device according to the first embodiment.

An electric circuit for selectively energizing LED 5a, 5b, 5c is shown in FIG. 5, wherein known light measuring circuit 10 includes photosensitive elements for measuring light which is being directed through an objective lens from an object. Light measuring circuit 10 is arranged to provide at its output terminal a voltage commensurate with the results of measurements of the brightness of an object, the aperture value and the preset film sensitivity. R1, R2, R3 and R4 represent comparing resistors, which are connected in series with constant current source I, and which respectively have plus terminals a, b, c, and d, at which there are obtained voltages proportional to the resistance value of R1, the sum of the resistance values of R1 and R2, the sum of the resistance values of R1, R2 and R3, and the sum of the resistance values of R1, R2, R3 and R4. Shown at 11, 12, 13 and 14 are comparing circuits each consisting of a differential amplifier. These comparing circuits each have one of their input terminals connected to an output terminal of light measuring circuit 10 and the other of their input terminals connected to a respective terminal a, b, c, and d of the resistors R1, R2, R3 and R4. Referring by way of example to the comparing circuit 11, if the output voltage of light measuring circuit 10 is higher than that at terminal a, comparing circuit 11 produces a low level output. However, if the output voltage of circuit 10 is lower than that at terminal a, then comparing circuit 11 produces a high level output.

Pulse generating circuit 15 generates pulse signals at a given period. Two input terminals of NAND gate 16 are connected to the output terminals of comparing circuit 11 and the pulse generating circuit 15, respectively. One input terminal of NAND gate 17 is connected through NOT circuit (i.e., invertor) 18 to an output terminal of comparing circuit 14, and the other input terminal of NAND gate 17 is connected directly to an output terminal of pulse generating circuit 15.

Two input terminals of AND gate 19 are connected to the output terminals of NAND gate 16 and comparing circuit 11, respectively, while one input terminal of AND gate 20 is connected through NOT gate 21 to an output terminal of comparing circuit 13, and the other input terminal thereof is connected to an output terminal of NAND gate 17. LED 5a and 5c are connected to the output terminals of AND gates 20, 19 respectively, and LED 5b is connected between the output terminals of comparing circuits 12 and 13.

If the brightness of an object is extremely low and the exposure is controlled by a shutter speed within or at the lower limit thereof, the output levels from comparing circuits 11, 12, 13 and 14 will be raised, as shown in the Table of FIG. 6. As a result, alternating signals are obtained at the output terminal of NAND gate 16, the alternating signals being lowered only when the output level from pulse generating circuit 15 is high. At the output terminal of AND gate 19, there are obtained signals whose levels are high only when the signal from NAND gate 16 is high, whereby LED 5c repetitively flickers, thereby periodically illuminating character S on the indicating plate 8. The output from comparing circuit 14 is brought to a low level by NOT gate 18, so that signals of a given high level are obtained at the output terminal of NAND gate 17, while low level signals are obtained at the output terminal of NOT gate 21. Thus, LED 5a is not energized. Furthermore, since signals of a high level are impressed on LED 5b across both terminals thereof, LED 5b is also not energized. Thus, LED 5c, in this case, continues flashing to illuminate the character S, thereby indicating within the viewfinder that the shutter speed will be lower than the lower speed limit.

If the shutter speed is higher than the lower speed limit but lower than the blur limit, then only the output from comparing circuit 11 will be low, as seen in FIG. 6. Consequently, a high level of signals is usually obtained at the output terminal of NAND gate 16, so that LED 5c is continuously lit, thereby illuminating the character S. Moreover, since LED 5a and 5b are maintained in the same condition was previously described with the shutter speed at the low limit, LED 5a and 5b are not energized.

In the case where the shutter speed is in a medium speed range which is higher than the blur limit but lower than the medium speed of 1/125 sec., the output levels from comparing circuits 11 and 12 will be low, while the output levels from comparing circuits 13 and 14 will be high. Thus, AND gates 19 and 20 produce low level outputs, and LED 5a and 5c are not energized. Only LED 5b is lit continuously, because high and low levels of signals are impressed on LED 5b across the respective terminals thereof continuously, whereby character M is illuminated.

In the high shutter speed range from 1/125 to 1/1000 sec., only the output from comparing circuit 14 will be high. Accordingly, LED 5b and 5c are not energized, and in turn, only LED 5a is continuously lit to illuminate character H, as the output from AND gate 20 is maintained high.

If the brightness of an object is to high and the shutter speed must be increased to a value much higher than 1/1000 sec., which is the highest limit of the shutter speed, then all the outputs from comparing circuits 11, 12, 13 and 14 will be low. In this case, LED 5b and 5c are not energized, because these LEDs are maintained in the same condition as in the high shutter speed range, while only LED 5a periodically flickers, because alternating signals are obtained at the output terminal of NAND gate 17, the alternating signals becoming low only when the output from pulse generating circuit 15 is high, so that character H is illuminated.

In the embodiment shown, three LEDs are used for distinguishing one shutter speed from the other at a medium speed of 1/125 sec. This is a considerable decrease in the number of the illuminating elements as compared with those used in prior art indicating devices, and is advantageous in reducing the manufacturing cost. The illumination of the characters H and S due to flickering and lighting of LED 5a and 5c as well as illumination of the character M due to lighting of LED 5b according to the indicating device of the present invention enable five exposure values to be indicated, serving the intended purpose as a shutterspeed indicator for use in an electric exposure camera.

FIGS. 7 and 8 show a second embodiment of the invention. In this embodiment, indicating plate 8 is disposed such that the character H on the plate 8 is seen in the upper portion of the field of view in the finder, as in the first embodiment. This embodiment is provided as a countermeasure when the character H is seen against the background of bright sky and thus is hardly distinguishable from the sky, even if LED 5a flickers or lights.

More particularly, only two letters M and S on the indicating plate are illuminated by LEDs, and the letter H is illuminated by the outer light having been diffused by focussing plate 1 and passed through a half-transparent plate. In FIGS. 7 and 8, light guide 107 consists of guide portions $107_2$ and $107_3$ for transmitting the light from LEDs, which illuminates the letters M and S, and of a connecting portion $107_5$ which connects the guide portions. Light guide 107 is fixed to the camera body by a holder, which, in this embodiment, does not have the light intercepting portion to cover the reflecting surface but instead has an intercepting plate 109 fixed on focussing plate 1. As shown in FIG. 7, intercepting plate 109 has protruding portions 109a, 109b, 109c, which are located to intercept the outer light advancing to letters H, M and S, on the indicating plate after being diffused by focussing plate 1. Among these protruding portions 109a is made half-transparent to decrease the intensity of the outer light on the letter H.

Focussing plate 1 is held by a focussing plate holder 110, and the condenser lens is not shown in this embodiment. Further, while also not shown, the electric circuit for selectively lighting LEDs 5b, 5c has the same arrangement as that of FIG. 5, except that resistor $R_4$, comparing circuit 14, NOT circuits 18, 21, NAND gate 17, and AND gate 20 are not provided.

In this embodiment, if an object to be photographed is very bright, the LEDs do not emit light and therefore the letters M and S do not appear in the viewfinder. The letter H appears definitely in the viewfinder because the light passing through half-transparent portion 109a of intercepting plate 109 is strong in accordance with the intensity of the outer light diffused by focussing plate 1. The other shutter speeds 1000, 125, 30, 8S are also illuminated with the outer light passing by the intruding portions of the intercepting plate, and thus they can be definitely seen in the viewfinder. Thus, all the indicators except M and S are illuminated by the outer light and appear in the viewfinder.

If a shutter speed lower than the shutter speed critical to the blur of an obtained picture when the camera is hand-held but higher than the lowest shutter speed is to be obtained, LED 5c emits light to illluminate the letter S. But, as the object is dark in this case, the outer light passing through protruding portion 109a of intercepting plate 109 becomes weak. Therefore, the letter H is not seen so definitely. Thus there is no mistaking H for S.

In this embodiment, it is impossible to distinguishably indicate shutter speeds beyond 1/1000 second and between 1/1000 second and 1/125 second. However, it has the advantage that the number of LEDs is reduced by one as compared with the first embodiment.

Figure 11:
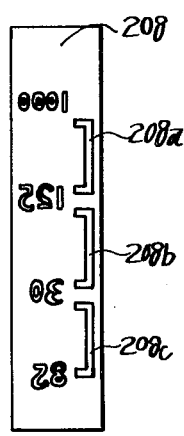
FIG. 11 is a rear view of a plate member shown in FIGS. 9 and 10.
Figure 12:
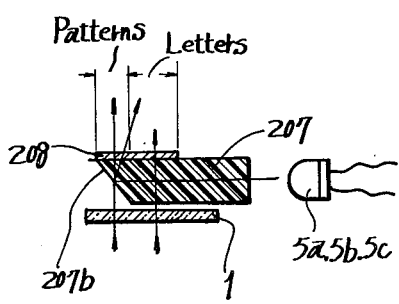
FIG. 12 is a sectional view of an essential part of a shutter speed indicating device according to a fourth embodiment of the present invention.

FIGS. 9 to 11 show a third embodiment in which, instead of the letter H, M, or S, patterns 1000, 125, 30, 8S, 108a, 108b, 108c are provided between the letters representing shutter speeds. The patterns are indicated with the light from LEDs 5a, 5b, 5c, while the shutter speeds 1000, 125, 30, 8S are illuminated with the outer light passed through a staircase surface which is provided beside the reflecting surface 207b of light guides 207$_1$, 207$_2$, 207$_3$ so that the outer light may be able to pass upwardly therethrough. On the reflecting surface 207c, an intercepting portion 209 is attached and the outer light from the focussing plate to pattern 208a, 208b, 208c is either reflected or absorbed by the intercepting portion. Also, as the light from LEDs is usually red, indicating plate 208 is colored green, which is the complementary color of red, except the patterns 208a, 208b, 208c and the shutter speeds 1000, 125, 30, 8S, whereby the illuminated pattern appears more definitely in the viewfinder in response to the lighting or the flickering of an LED.

Where an indicating plate 208 as shown in this embodiment is used, it is not always necessary to provide stepped or terraced surfaces 207a on respective guide portions 207$_1$, 207$_2$ and 207$_3$, or to bond light-shielding material 209 to reflecting surface 207b. For example, if the device is arranged in the manner shown in FIG. 12, a pattern may be seen due to illumination of the LED, and the characters representing a series of shutter speeds will be seen due to external light. In FIG. 12, light reflecting surface 207b of light guide 207 is positioned right below the patterns 208a, 208b and 208c on the indicating plate 208, so that light incident upon reflecting surface 207b and diffused from focussing plate 1 is directed outside the optical path of the finder. Accordingly, even if patterns 208a, 208b and 208c are illuminated by such diffused light, none of these patterns will appear in the field of view in the finder. Thus, there is no possibility that a pattern illuminated by the light from an LED is mistaken for a pattern which is not illuminated by the light from an LED.

Figure 13:
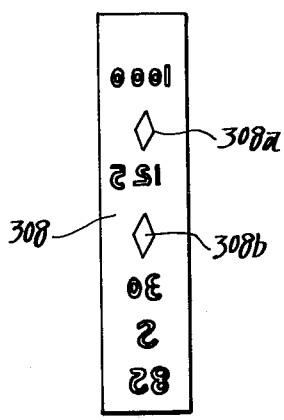
FIG. 13 is a rear view of another plate member usable with all of the embodiments.
Figure 14:
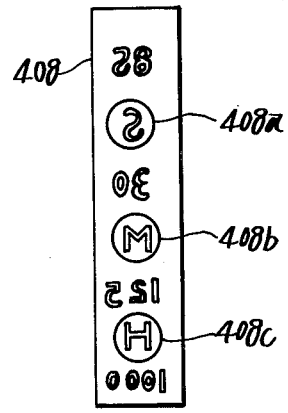
FIG. 14 is a rear view of still another plate member usable with the embodiments.

FIGS. 13 and 14 show various kinds of indicating plates. Indicating plate 308 in FIG. 13 has punched-out portions 308a and 308b in the positions corresponding to the characters H and M, and is achromatic and transparent in the portions of characters which show a series of shutter speeds, as well as in the portion of character S, with the other areas being colored transparent green. Where a pattern indicating the medium shutter speed range is simply provided in the form of a character, the character would be somewhat indistinct, even if it is illuminated by the light from an LED, because the field of view in the finder is bright. In the case of this type of indicating plate, light from an LED comes directly into the eyes through the punched-out portions 308a and 308b, so that the punched-out portions 308a and 308b will be clearly seen, even if the field of view in the finder is bright. Where the scene is dark, then the brightness of the field of view in the finder is low, and the characters representing a series of shutter speeds will be obscure. In such a case, there should be indicated the character S signifying "slow", thereby warning that a shutter speed on the blur limit or a speed outside the lower limit will be obtained.

An indicating plate 408 shown in FIG. 14 has colorless, light-diffusing circular portions 408a, 408b and 408c which encircle the characters H, M and S, respectively, with the other areas being colored transparent green. Thus, circular portions 408a, 408b and 408c are seen in red due to light from an LED, with the improved readiness in reading the characters H, M and S encircled therein. An important feature of such an indicating plate is that a series of shutter-speed indicating characters and the characters H, M, S are vertically inverted, so that a character 8S representing a lower shutter speed is seen in the upper portion of the field of view in the finder. Thus if the camera is horizontally held, a bright sky would be seen in the upper portion of the field of view in the finder, i.e., if the character H is seen in the upper portion of the finder as in the case of the first embodiment, then the character H would be seen indistinctly from the bright sky in overlapped relation thereto. In this case, a great amount of current must be fed to an LED so as to increase the quantity of light so that the character H may be clearly seen. With the indicating plate 408 of this embodiment, the character S becomes luminescent or flickers, when the brightness of an object is low. Thus, even if the character S is seen against the background of the sky, the character S will be clearly seen, because the brightness of the sky is low. However, even if the brightness of an object is high and the character H is lit or flickers, a dark object such as ground, is often seen in the lower portion of the field of view in the finder, and the character H will in most cases be seen clearly.

The embodiments shown in the specification are not given in a limitative sense and may be applicable to an electric exposure camera other than a single lens reflex camera. With a shutter-speed-priority automatic aperture control camera, an aperture value may be indicated as an exposure value, in which an exposure-responsive limit-exposure-value of high brightness is expressed by a minimum aperture value, while an exposure-responsive-limit-exposure-value of low brightness is expressed by a fully-opened aperture value. Furthermore, the exposure value or the exposure-responsive-limit, fractional exposure values of the limit exposure value, and the exposure value ranges between these exposure values can be indicated by characters, patterns or other marks, and other optical indicating elements such as lamps or liquid cells may be substituted for the LEDs. However, when liquid cells are used as optical indicating elements in the above described embodiments, the numerals representative of the shutter speeds have to be illuminated also by the external light.

What is claimed is:

1. In a camera having a viewfinder and wherein an exposure factor is automatically controlled in accordance with the brightness of an object to be photographed, an exposure factor indicating device comprising:

first symbols each representative of values of the exposure factor, two of said first symbols respectively representing values critical to high brightness and low brightness and all of said first symbols being arranged in the order of the values of the exposure factor represented thereby;

a plurality of second symbols respectively arranged between said first symbols, said first and second symbols being disposed in said viewfinder to be observed therethrough;

a control circuit for generating an electric signal commensurate with the automatically controlled value of said exposure factor;

a plurality of optical indicating elements each respectively disposed in corresponding relation to one of said second symbols for optically indicating the corresponding second symbol when actuated;

means for selectively actuating one of said optical indicating elements in accordance with said electric signal, said means including an electric circuit which selectively continuously lights one of said optical indicating elements when said signal corresponds to a value of the exposure factor between the critical values and which intermittently lights one of said optical indicating elements disposed respectively in corresponding relation to said second symbols which are in turn adjacent to said first symbols representative of the critical values when said electric signal corresponds to a value of the exposure factor beyond the critical values; and means for introducing light from the outside of said camera to said first symbols for illumination thereof.

2. In a single lens reflex camera which includes a viewfinder having a focussing plate on which an image of an object to be photographed is formed, and a pentagonal prism disposed above said focussing plate to receive the image, and wherein an exposure factor is automatically controlled in accordance with the brightness of the object, an exposure factor indicating device comprising:

a plate member disposed between said focussing plate and said pentagonal prism and bearing a plurality of first and second symbols, said first symbols being representative of values of the exposure factor, two of said first symbols respectively representing values critical to high brightness and low brightness, all of said first symbols being arranged in the order of the values of the exposure factor represented thereby and said second symbol being respectively arranged between said first symbols;

a control circuit for generating an electric signal commensurate with an automatically controlled value of said exposure factor;

a plurality of optical indicating elements each respectively disposed beside said focussing plate in corresponding relation to one of said second symbols for optically indicating the corresponding second symbol when actuated;

means for introducing light from the outside of said camera to said plate members, said light introducing means includes said focussing plate and a movable mirror movable between a picture taking position and an image viewing position, the light from the outside reflected by said movable mirror in said image viewing position and passing through said focussing plate illuminating said plate member;

a plurality of light guides respectively disposed between said optical indicating elements and said second symbols, each of said light guides including a light incident surface facing the corresponding optical indicating element and a light emitting surface facing the corresponding second symbol; and light shielding means disposed between said focussing plate and said plate member for preventing the light from the outside passing through said focussing plate from illuminating said second symbols.

3. In a single lens reflex camera which includes a viewfinder having a focussing plate on which an image of an object to be photographed is formed and a pentagonal prism disposed above said focussing plate to receive the image, and wherein an exposure factor is automatically controlled in accordance with the brightness of the object, an exposure factor indicating device comprising:

a plate member disposed between said focussing plate and said pentagonal prism and bearing a plurality of first symbols and a plurality of second symbols respectively along a first path and a second path separated from one another, said first symbols being representative of values of the exposure factor, two of said first symbols respectively representing values of the exposure factor critical to high brightness and low brightness respectively, all of said first symbols being arranged in the order of the values of the exposure factor represented thereby, and said second symbols being respectively arranged between said first symbols;

a control circuit for generating an electric signal commensurate with an automatically controlled value of the exposure factor;

a plurality of light emitting elements each respectively disposed beside said focussing plate in corresponding relation to one of said second symbols for indicating the corresponding second symbol when lit;

means for selectively lighting one of said light emitting elements in accordance with said electric signal;

means for introducing light from the outside of said camera to said first symbols for illumination thereof, said light introducing means including said focussing plate and a mirror movable between a viewing position and a picture taking position such that the light from the outside of the camera reflected by said movable mirror in the viewing position and having passed through said focussing plate illuminates said first symbols; and a plurality of light guides respectively disposed between said light emitting elements and said second symbols, each of said light guides including a light incident surface facing the corresponding light emitting element, a light emitting surface facing the corresponding second symbol, a transparent surface inclined and terraced for permitting the light from the outside having passed through said focussing plate to travel towards said first path through said light emitting surface and a coated surface for reflecting the light from the corresponding light emitting element to said second path through said light emitting surface and for preventing the light from the outside having passed through said focussing plate to travel towards said second path through said light emitting surface.

4. In a camera having a viewfinder and wherein an exposure factor is automatically controlled in accordance with the brightness of an object to be photographed, an exposure factor indicating device comprising:

first symbols representative of values of the exposure factor, two of said first symbols respectively representing values critical to high and low brightness and all of said first symbols being arranged in the order of the values of the exposure factor represented thereby;

a plurality of second symbols each respectively arranged between said first symbols, said first and second symbols being arranged in said viewfinder so as to be observed therethrough;

a control circuit for generating an electric signal commensurate with an automatically controlled value of the exposure factor;

a plurality of light emitting elements each respectively disposed in corresponding relation to one of said second symbols except said second symbol adjacent to said first symbol for high brightness for indicating the corresponding second symbol when lit;

means for selectively lighting one of said light emitting elements in accordance with said electric signal, said means including an electric circuit for selectively continuously lighting one of said light emitting elements when said electric signal corresponds to a value of the exposure factor between the critical value for low brightness and a value of the exposure factor represented by said first symbol adjacent to said first symbol for high brightness, and intermittently lighting said light emitting element corresponding to said second symbol adjacent to said first symbol for low brightness when said electric signal corresponds to a value of the exposure factor beyond the critical value for low brightness; and means for introducing light from the outside of said camera to said first symbols and said second symbol adjacent to said first symbol representing said high brightness.

5. In a single lens reflex camera wherein an exposure factor is automatically controlled in accordance with the brightness of an object to be photographed, an exposure factor indicating device comprising:

a viewfinder including a focussing plate on which an image of the object is formed, a pentagonal prism disposed above said focussing plate to receive the image, and a mirror movable between a viewing position and a picture taking position;

first symbols representative of values of the exposure factor, two of said first symbols respectively representing values critical to high and low brightness and all of said first symbols being arranged in the order of the values of the exposure factor represented thereby;

a plurality of second symbols each respectively arranged between said first symbols;

a plate member bearing said first and second symbols and disposed between said focussing plate and said pentagonal prism so that said first and second symbols can be observed through said viewfinder, said movable mirror in the viewing position and said focussing plate constituting means for introducing light from the outside of said camera toward said plate member for illumination thereof;

a control circuit for generating an electric signal commensurate with an automatically controlled value of the exposure factor;

a plurality of light emitting elements each respectively disposed in corresponding relation to one of said second symbols except said second symbol adjacent to said first symbol for high brightness for indicating the corresponding second symbol when lit;

means for selectively lighting one of said light emitting elements in accordance with said electric signal; and a light shielding member disposed between said plate member and said focussing plate and including portions for preventing the light from the outside reflected by said movable mirror in the viewing position and having passed through said focussing plate from illuminating said second symbols except said second symbol adjacent to said first symbol for high brightness.

6. An exposure factor indicating device as in claim 5, wherein said light shielding member further includes a semi-transparent portion for weakening the light from the outside having passed through said focussing plate and advancing towards said second symbol adjacent to said first symbol for high brightness.

7. In a camera which includes a viewfinder and wherein shutter speed is automatically controlled in accordance with the brightness of an object to be photographed, a shutter speed indicating device comprising:

indicia representative of a range of a shutter speed and arranged in said viewfinder, said indicia including a pair of first symbols representative of the higher and lower limits of said range, and a second symbol arranged between said first symbols, the lower limit of said range being the slowest shutter speed for said camera;

an optical indicating element arranged in said viewfinder for illuminating said second symbol when lit;

a control circuit for generating an electric signal commensurate with the automatically controlled shutter speed; and means responsive to said signal for actuation of said optical indicating element, said means including a circuit which continuously lights said optical indicating element when said signal corresponds to a value of the shutter speed within said range, and which intermittently lights said optical element when said signal corresponds to a value of the shutter speed which is slower than said slowest shutter speed.

8. In a camera which includes a viewfinder wherein shutter speed is automatically controlled in accordance with the brightness of an object to be photographed, a shutter speed indicating device comprising:

indicia representative of a range of a shutter speed and arranged in said viewfinder, said indicia including a pair of first symbols representative of the higher and lower limits of said range and a second symbol arranged between said first symbols, the higher limit of said range being the fastest shutter speed for said camera;

an optical indicating element arranged in said viewfinder for illuminating said second symbol when lit;

a control circuit for generating an electric signal commensurate with the automatically controlled shutter speed; and means responsive to said signal for actuation of said optical indicating element, said means including a circuit which continuously lights said optical indicating element when said signal corresponds to a value of the shutter speed within said range, and which intermittently lights said optical element when said signal corresponds to a value of the shutter speed which is faster than said fastest shutter speed.

9. In a camera wherein shutter speed is automatically controlled in accordance with the brightness of an object to be photographed, a shutter speed indicating device comprising:
at least three indicia representative of adjacent ranges of shutter speed, the higher limit of the highest range being the fastest shutter speed for said camera and the lower limit of the lowest range being the slowest shutter speed for said camera;
optical indicating elements corresponding one-by-one to said ranges for indicating the corresponding range when lit;
a control circuit for generating an electric signal commensurate with the automatically controlled shutter speed; and
means responsive to said signal for selective actuation of said optical indicating elements, said means including an indicating circuit which continuously lights one of said optical indicating elements when said signal corresponds to a value of the shutter speed within one of said ranges to which said lit optical indicating element corresponds, said indicating circuit intermittently lighting only said optical indicating element corresponding to said lowest range with the other optical indicating elements being kept turned off when said signal corresponds to a value of the shutter speed which is slower than said slowest shutter speed, and intermittently lighting only said optical indicating element corresponding to said highest range with the other optical indicating elements being kept turned off when said signal corresponds to a value of the shutter speed which is faster than said fastest shutter speed.

10. A shutter speed indicating device as in claim 9, wherein said indicating circuit includes:
means for generating reference voltage signals;
means for comparing said signal from said control circuit with said reference voltages to generate an output representative of the ranges in which the automatically controlled shutter speed falls, said output being input to said optical indicating elements;
a pulse generator; and
means connected with said comparing means and said pulse generator for selecting lighting modes of said indicating elements in accordance with said output, said lighting modes selecting means having a circuit which allows said output to continuously light one of said optical indicating elements when said output corresponds to one of said ranges represented by said indicia, and which periodically interrupts said output under control of said pulse generator for intermittent lighting of one of said optical indicating elements corresponding to said highest range when said output corresponds to the range of a shutter speed beyond said highest range, and for intermittent lighting of one of said optical indicating elements corresponding to said lowest range when said output corresponds to the range of a shutter speed beyond said lowest range.

11. In a camera which includes a viewfinder and wherein shutter speed is automatically controlled in accordance with the brightness of an object to be photographed, a shutter speed indicating device comprising:
a plurality of liminescent elements respectively corresponding to different ranges of shutter speeds, and arranged in said camera so as to be viewed through said viewfinder, the upper limit of the highest range and the lower limit of the lowest range being the fastest shutter speed for said camera and the slowest shutter speed for said camera, respectively;
a control circuit for generating an electric signal commensurate with the automatically controlled shutter speed; and
means responsive to said electric signal for actuation of said luminescent elements, said means including a circuit which continuously lights one of said luminescent elements when said electric signal corresponds to a value of the shutter speed which falls within the corresponding range, and which intermittently lights only one of said luminescent elements corresponding to the highest range with the other luminescent elements being kept turned off when said electric signal corresponds to a value of the shutter speed which is faster than said fastest shutter speed, and only another of said luminescent elements corresponding to the lowest range with the other luminescent elements being kept turned off when said signal corresponds to a value of the shutter speed which is slower than said slowest shutter speed.

12. In a camera which includes a viewfinder and wherein shutter speed is automatically controlled in accordance with the brightness of an object to be photographed, a shutter speed indicating device comprising:
a plurality of luminescent elements for indicating the automatically controlled shutter speed, said luminescent elements being disposed in said camera so as to be viewed in a row through said viewfinder, and at least one of said luminescent elements viewed at the lowest position in the row representing the predetermined range of shutter speeds, the lower limit of which being the slowest shutter speed for said camera, said range extending over a plurality of shutter speeds represented by 1 Ev steps wherein Ev represents an exposure value according to the APEX system;
a control circuit for generating an electric signal commensurate with the automatically controlled shutter speed; and
means responsive to said electric signal for actuation of said luminescent elements, said means including a circuit which continuously lights one of said luminescent elements when said electric signal corresponds to a value of the shutter speed represented by said lit luminescent element, and which exclusively and intermittently lights said luminescent element viewed at the lowest position in the row when said electric signal corresponds to a value of the shutter speed which is slower than said slowest shutter speed.

* * * * *